UNITED STATES PATENT OFFICE.

RICHARD T. CLARKE, OF CINCINNATI, OHIO, ASSIGNOR TO HIMSELF AND GABRIEL A. TAYLOR, OF SAME PLACE.

IMPROVED PROCESS OF PURIFYING LINSEED-OIL.

Specification forming part of Letters Patent No. 103,141, dated May 17, 1870.

*To all whom it may concern:*

Be it known that I, RICHARD T. CLARKE, of Cincinnati, Hamilton county, Ohio, have invented a new and useful Manufacture of Purified Linseed-Oil, of which the following is a specification.

My invention consists in a new process for the manufacture of linseed-oil purified from all fatty and coloring impurities without boiling, and which enables it to dry of itself within eight to ten hours, when spread upon any surface that is not greasy.

This oil will remain limpid, and never become fatty or greasy, nor rancid, nor will it discolor the most delicate pigment with which it may be mixed.

White lead and zinc white may be used with this oil without any danger of changing color, and it will, it is believed, prove invaluable in the manufacture of varnishes; while, in the manufacture of white lead or zinc white, its transparent and colorless qualities will make it preferable to any other preparation now in the market.

It is peculiarly applicable for the use of artists in painting upon glass, &c., and may be employed to give an enameled surface to metallic roofing, that will not crack or blister in the sun, and that will preserve the surface of the metal from oxidation.

I place the crude linseed-oil in a cylindrical vessel lined with metallic lead, and which I call the triturator. With the oil is mixed pulverized animal charcoal, in the proportion of two ounces of charcoal to each gallon of oil. The triturator is provided with two oppositely-revolving agitators, armed with rods or prongs, and with a means of forcing into the bottom of the vessel a constant current of atmospheric air, which, with the aid of the constant motion of the mass by the agitator, permeates the same, and causes it to assume the appearance of black foam, or froth.

This first step of the process takes, in the production of oil for house-painters, about one hour, and for artists' use about two hours.

The mass is then removed into a second cylinder, and treated with three ounces of kaloline to the gallon of crude oil, and treated in a similar manner to that of the first step, and for about the same periods, according to the quality of oil desired.

The kaloline, being heavy, falls to the bottom, taking down with it the animal charcoal and the fatty matter, but leaving the oil a little muddy.

The oil in then removed to a third vessel, which may be made of glass with a metallic lead bottom, with two or more cocks, and allowed to settle, which operation takes from two to four days.

The clear oil is then decanted off into a second glass vessel or jar, having strips of metallic zinc suspended in it, and, the air and light being freely admitted, the oil becomes, in the course of forty-eight hours to four days, clear and ready for use or bottling.

While describing the mechanical appliances successfully employed by me, I do not desire to restrict myself thereto, and I reserve the right to make all such appliances, in whole or part, the subject of a separate patent.

Nor do I confine myself to the specific times here set down, as these will vary with different grades of oil, conditions of atmosphere, and the nature of the mechanical appliances.

I claim herein as new and of my invention—

The process for the manufacture of purified linseed-oil, substantially as set forth.

In testimony of which invention I hereunto set my hand.

RICHARD T. CLARKE.

Witnesses:
  GEO. H. KNIGHT,
  JAMES H. LAYMAN.